United States Patent
Tu

(10) Patent No.: US 6,789,734 B1
(45) Date of Patent: Sep. 14, 2004

(54) ELECTRICAL CHARGER INTEGRATING A BUSINESS CARD SCANNER THEREIN

(75) Inventor: I Hung Tu, Yun Lin Hsien (TW)

(73) Assignee: Lite-On Technology Corporation, Taipei (TW)

(*) Notice: Subject to any disclaimer, the term of this patent is extended or adjusted under 35 U.S.C. 154(b) by 0 days.

(21) Appl. No.: 10/459,458

(22) Filed: Jun. 12, 2003

(30) Foreign Application Priority Data

Feb. 27, 2003 (TW) ...................................... 92203120 U

(51) Int. Cl.[7] ................................................. G06K 7/06
(52) U.S. Cl. ...................................... 235/441; 320/114
(58) Field of Search ........................ 235/462.45, 472.01, 235/441, 451; 320/114, 115

(56) References Cited

U.S. PATENT DOCUMENTS 5,467,403 A * 11/1995 Fishbine et al. ............ 382/116
5,747,785 A * 5/1998 Miller et al. ............ 235/472.01
5,928,292 A * 7/1999 Miller et al. .................... 701/1
6,246,211 B1 * 6/2001 Dalton et al. ................ 320/114

* cited by examiner

Primary Examiner—Daniel St.Cyr
(74) Attorney, Agent, or Firm—Birch, Stewart, Kolasch & Birch, LLP

(57) ABSTRACT

An electrical charger integrating a business card scanner therein has the functions of charging a personal digital assistant (PDA) and recording a business card. The electrical charger has a casing and a charger body. The casing has an entry, an exit and a cradle mounted on the casing. The cradle has a first through hole and a second through hole. The charger body is mounted inside the casing, and has a charging unit with a power connector, and a scanning unit with a signal connector. The power connector and the signal connector respectively penetrate through the first and second through holes. The business card travels from the entry of the casing to the exit of the casing to be scanned by the scanner integrated in the electrical charger.

5 Claims, 5 Drawing Sheets

ELECTRICAL CHARGER INTEGRATING A BUSINESS CARD SCANNER THEREIN

BACKGROUND OF THE INVENTION

1. Field of the Invention

The invention relates to an electrical charger integrating a business card scanner therein. More particularly, the invention provides an electrical charger integrating a business card scanner that has the functions of charging a personal digital assistant (PDA) and scanning a business card.

2. Description of the Related Art

Usually, a conventional PDA is commercially sold with the additional provision of an electrical charger and a business card scanner. The electrical charger and the business card scanner are usually individual devices, which may not be convenient for the user to carry and use.

Furthermore, most of the currently commercially available business card scanners are adapted for use with personal or laptop computers. There are only a few choices for a PDA. The business card scanner for a PDA is further supplied with electrical power from the PDA itself, which increases the power consumption of the PDA.

SUMMARY OF THE INVENTION

It is therefore a principal object of the invention to provide an electrical charger capable of integrating a business card scanner therein to increase the convenience of use and the functionality of the electrical charger, in which the electrical power of the business card scanner is supplied from the electrical charger, rather than from the PDA.

It is another object of the invention to provide an electrical charger integrating a business card scanner therein, which allows a smoother conveyance of the business card through the sensing unit of the business card scanner.

To accomplish the above and other objectives, the invention provides an electrical charger that integrates a business card scanner therein. The electrical charger includes a casing and a charger body. The casing includes an entry, an exit and a cradle mounted on the casing. The cradle includes a first through hole and a second through hole. The charger body is mounted inside the casing, and includes a charging unit with a power connector, and a scanning unit with a signal connector. The power connector and the signal connector respectively penetrate through the first and second through holes. The business card travels from the entry of the casing to the exit of the casing to be scanned by the scanner integrated in the electrical charger.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
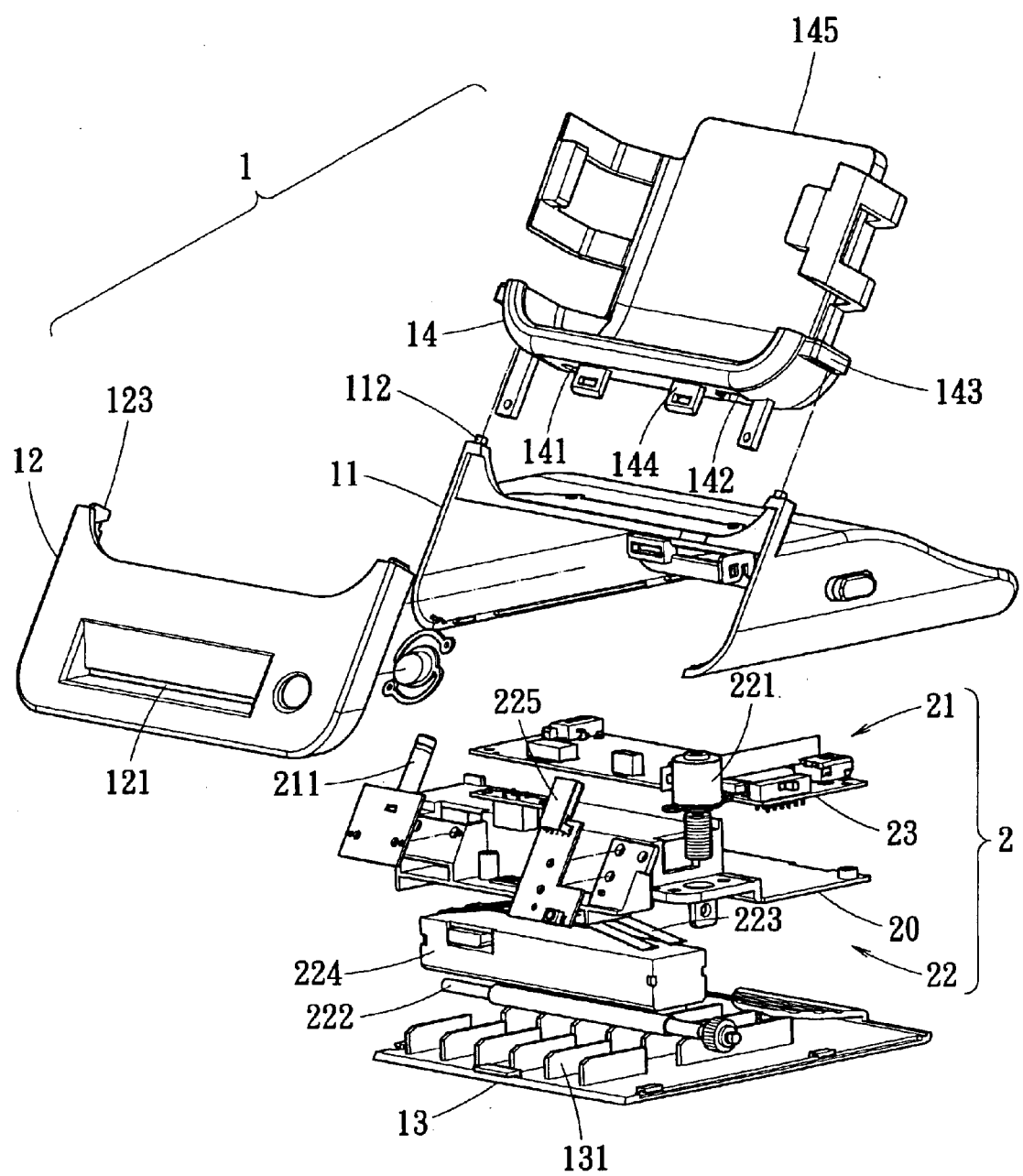
FIG. 1 is a detailed exploded view of an electrical charger according to one embodiment of the invention.

Wherever possible in the following description, like reference numerals will refer to like elements and parts unless otherwise illustrated.

Figure 2:
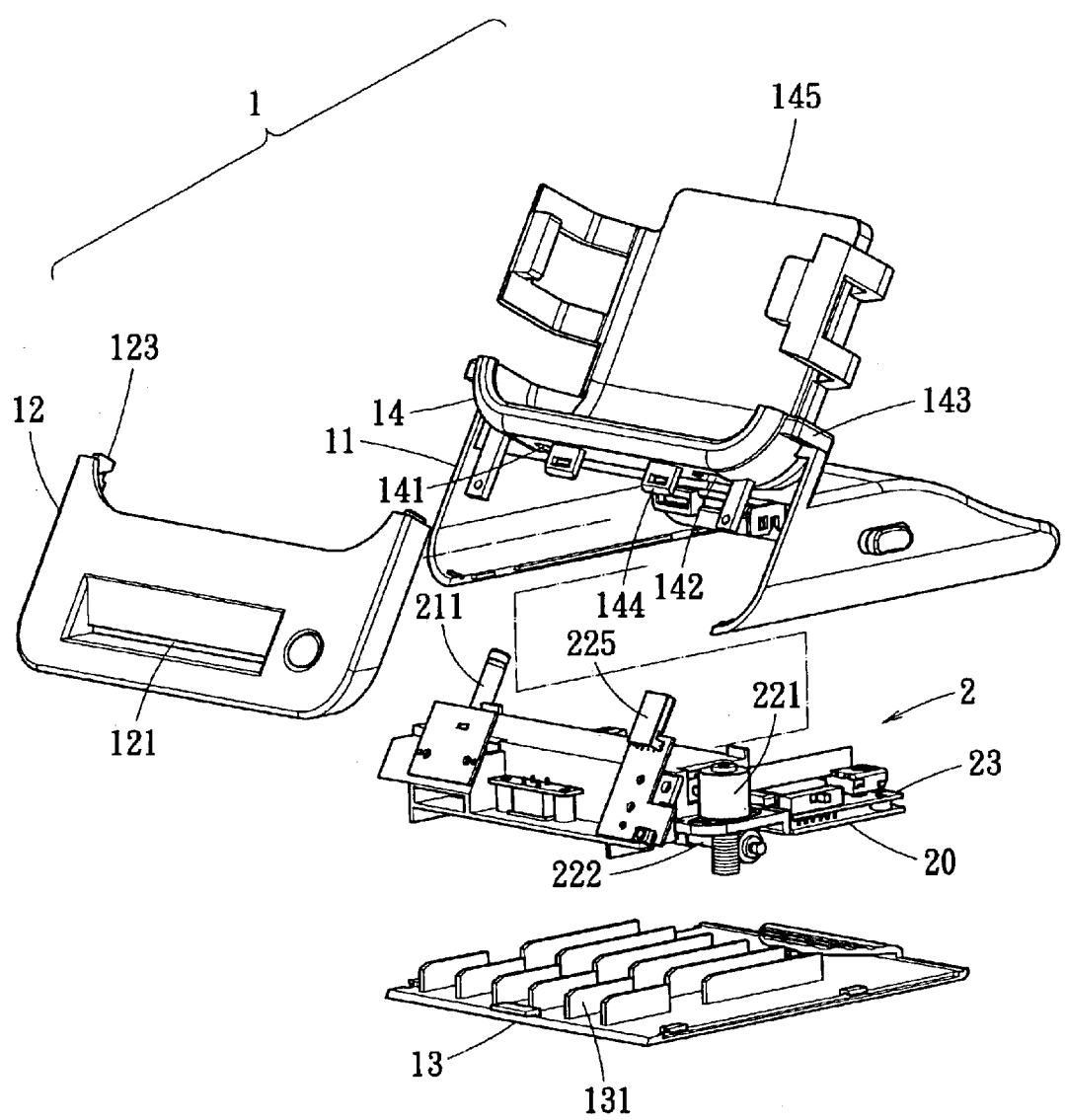
FIG. 2 is a general exploded view of an electrical charger according to one embodiment of the invention.
Figure 3:
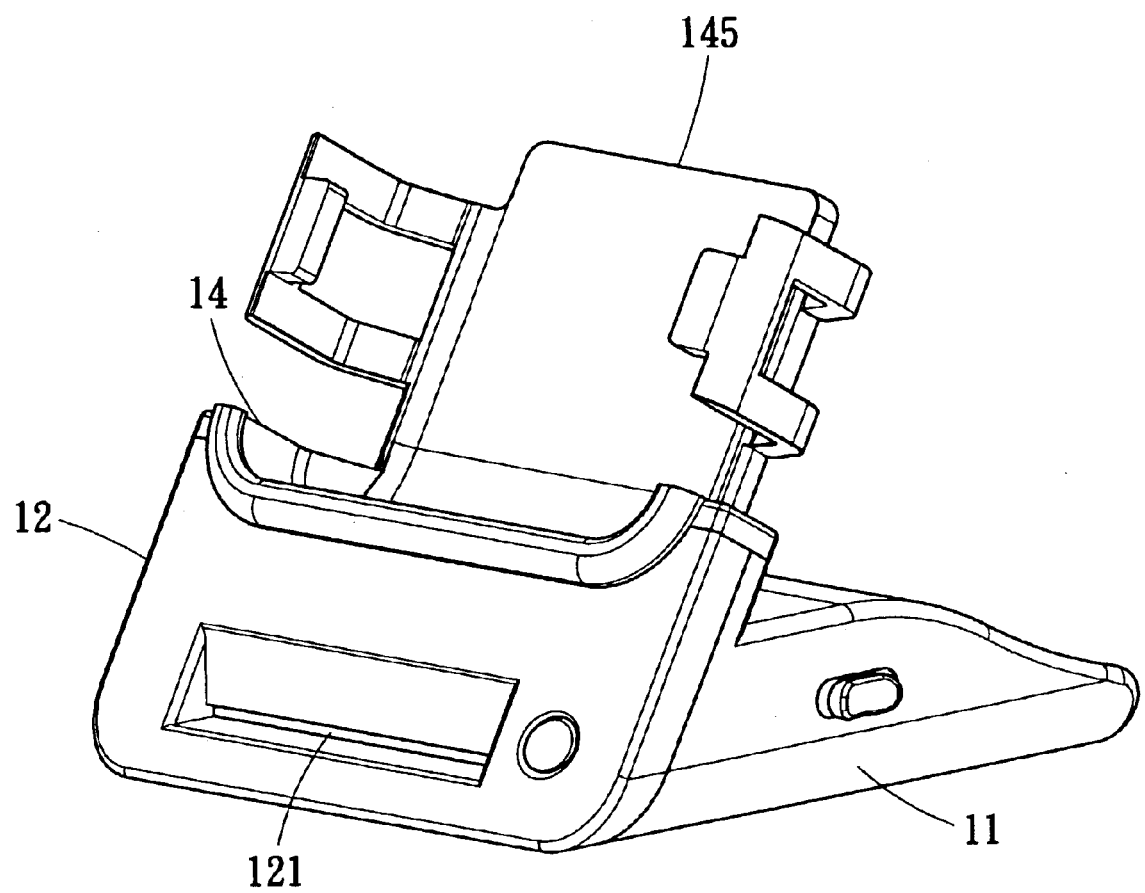
FIG. 3 is a perspective view of an electrical charger according to one embodiment of the invention.
Figure 4:
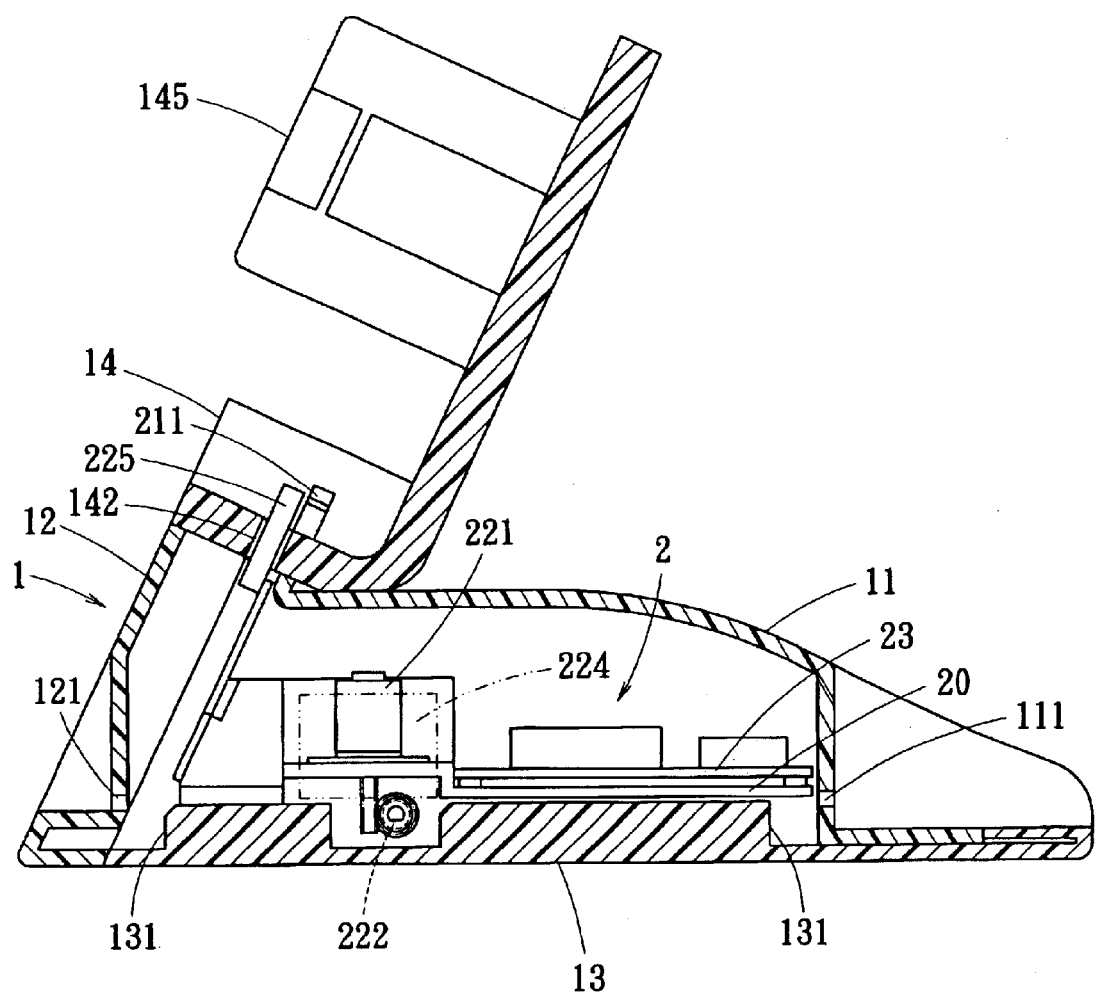
FIG. 4 is a cross-sectional view of an electrical charger according to one embodiment of the invention.
Figure 5:
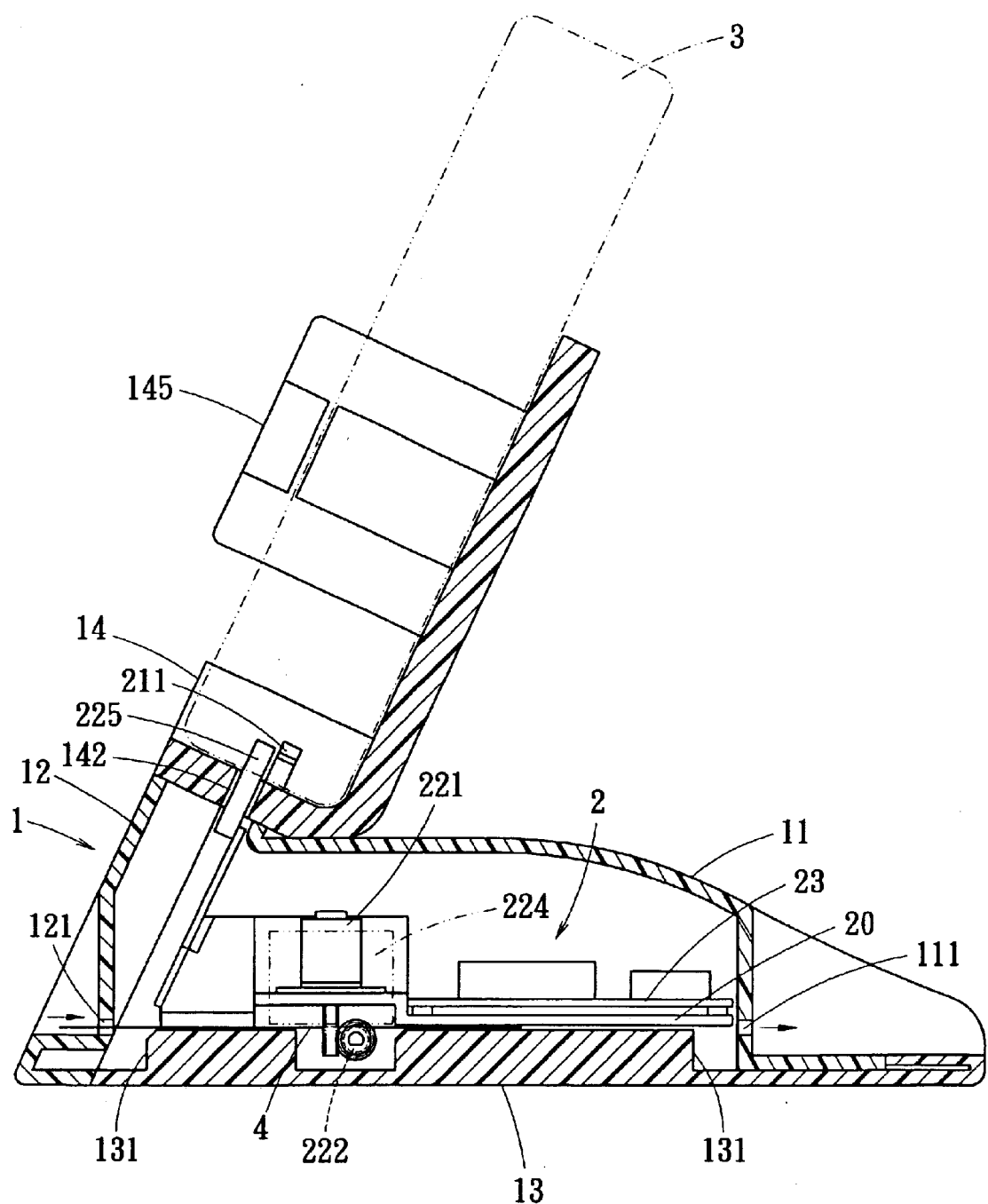
FIG. 5 is a cross-sectional view illustrating the operation of an electrical charger according to one embodiment of the invention.

Referring to FIGS. 1 to 5, the invention provides an electrical charger for a business card scanner. The electrical charger includes a casing 1 and a charger body 2. The casing 1 includes an entry 121, an exit 111 and a cradle 14 mounted on the casing 1. The cradle 14 is used to receive a personal digital assistant (PDA) 3 as indicated by reference numeral 3 in FIG. 5. The cradle 14 includes a first through hole 141 and a second through hole 142. The charger body 2 is mounted inside the casing 1 and includes a charging unit 21 with a power connector 211, and a scanning unit 22. The scanning unit 22 includes a signal connector 225, such as a USB connector, and serves to scan a business card 4. As shown in FIG. 4 and FIG. 5, the power connector 211 and the signal connector 225 respectively penetrate through the first and second through holes 141, 142. The business card 4 travels through the electrical charger from the entry 211 to the exit 111.

When the PDA 3 is placed in the cradle 14, the power connector 211 and the signal connector 225 are respectively inserted into corresponding connectors at a bottom of the PDA to simultaneously perform charging of the PDA and recording of the business card 4. The PDA 3 controls the scanning unit 22 via the signal connector 225. The scanned image data is stored in the PDA 3 through the signal connector 225. Therefore, the electrical charger not only provides the functions of charging the PDA 3 and recording the business card 4, but also individually supplies electrical power to the scanning unit 22 without consuming the power of the PDA.

Referring to FIG. 1 and FIG. 2, the charger body 2 further includes a base 20 and a control circuit 23, both being attached on the base 20. The control circuit 23 is mounted on an upper side of the base 20. The power connector 211 and the signal connector 225 are mounted on a front side of the base 20.

The electrical charger 21 further includes a charging circuit (not shown) for the control circuit 23 and is electrically connected to the power connector 221 to charge the PDA 3 via the power connector 211.

The scanning unit 22 further includes a sensing unit 224 with a contact image sensor therein, a resilient member 223, a driving member 221 and a roller 222. The sensing unit 224 is mounted at a bottom of the base 20, with a contact surface of the contact image sensor facing down to prevent any undue interference of ambient light. The resilient member 223 can be a resilient sheet or a spring. In this embodiment of the invention, the resilient member 223 is a resilient sheet mounted between the base 20 and the sensing unit 224 to drive the sensing unit 224 up and down. The roller 222 is mounted at a bottom of the base 20, adjacent to the contact surface of the contact image sensor of the sensing unit 224. Furthermore, the driving member 221 drives the roller 222 to rotate. When the business card 4 is inserted between the sensing unit 224 and the roller 222, the business card 4 is driven forward by the rotation of the roller 222 and scanned by the sensing unit 224.

Referring to FIG. 1 to FIG. 5, the casing 1 includes a cover 11, a front lip 12 enclosing a front part of the cover 11, and a bottom lip 13 enclosing a lower part of the cover 11. The entry 121 is formed through the front lip 12. As illustrated in FIG. 4 and FIG. 5, the exit 111 is formed through a backside of the cover 11. The cradle 14 is mounted above the cover 11 and the front lip 12. The cover 11, the front lip 12 and the cradle 14 respectively fasten with one another. Specifically, a first fixture 112 is mounted at a front side of the cover 11. The front lip 12 has a second fixture 123. The cradle 14 has third and fourth fixtures 143, 144. The first and second fixtures 112, 123 are combined in a shape compliant to the third fixture 143 in order to fit therein. The fourth fixture 144 of the cradle 14 engages with a corresponding fastener (not shown) inside the front lip 12. The bottom lip 13 slides along a bottom of the cover 11 and then engages with the cover 11. Thereby, a casing as shown in FIG. 3 to FIG. 5 is accomplished.

Furthermore, a rack 145 extends from a top of the cradle 14 to hold firmly the PDA 3 after the PDA 3 is placed in the cradle 14.

Referring to FIG. 4 and FIG. 5, the gap between the sensing unit 224 and the roller 222 faces the entry 121 and the exit 111 to allow the business card 4 to pass there through. Referring to FIG. 5, when the cradle 14 holds the PDA 3 and the business card 4 is inserted through the entry 121, the business card 4 is driven between the sensing unit 224 and the roller 222 toward the exit 111 under control of the PAD 3. As the business card passes by the sensing unit 224, it is scanned.

A plurality of ribs 131 is formed on an inner wall of the bottom lip 13 of the casing 1. The ribs 131 are located under the scanner body 2, which is opposite the sensing unit 224 mounted above the scanner body 2, to support the passing business card 4.

As described above, the business card scanner is integrated with the electrical charger to increase the convenience of use and the functionality of the electrical charger. The electrical power of the business card scanner is supplied from the electrical charger, rather than from the PDA, which avoids a rapid consumption of electrical power from the PDA. Furthermore, with a contact surface of the contact image sensor inside the sensing unit facing down, any undue interference of the ambient light is prevented and therefore the scanning quality is effectively enhanced. The ribs mounted at the bottom lip, opposite the contact surface of the contact image sensor, support the business card so that the business card passes by the sensing unit more smoothly.

Those skilled in the art will readily appreciate that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A structure of an electrical charger integrating a business card scanner, comprising:

a scanner casing for scanning a business card, and the scanner casing having an entry and an exit positioned at an opposite side of the entry;

a cradle mounted on the scanner casing for receiving and supporting a personal digital assistant (PDA), and the cradle having a first through hole and a second through hole; and an electronic assembly arranged inside the scanner casing, the electronic assembly including a charging unit with a power connector and a scanning unit with a signal connector, wherein the power connector and the signal connector respectively penetrate through the first and second through holes.

2. The electrical charger of claim 1, wherein the charger body further includes a base having the charging unit and the scanning unit mounted thereon.

3. The electrical charger of claim 2, wherein the scanning unit further includes a sensing unit with a contact image sensor therein.

4. The electrical charger of claim 1, wherein the signal connector is a USB connector.

5. The electrical charger of claim 1, wherein a rack further extends from a top of the cradle.

\* \* \* \* \*